(12) United States Patent
Balk

(10) Patent No.: US 10,259,664 B2
(45) Date of Patent: Apr. 16, 2019

(54) BUFFERING DEVICE

(71) Applicant: SPECIALTY CONVEYOR B.V., Zwaag (NL)

(72) Inventor: Wouter Balk, Baambrugge (NL)

(73) Assignee: SPECIALTY CONVEYOR B.V., Zwaag (NL)

( * ) Notice: Subject to any disclaimer, the term of this patent is extended or adjusted under 35 U.S.C. 154(b) by 0 days.

(21) Appl. No.: 15/751,649

(22) PCT Filed: Aug. 11, 2016

(86) PCT No.: PCT/NL2016/050574
§ 371 (c)(1),
(2) Date: Feb. 9, 2018

(87) PCT Pub. No.: WO2017/026895
PCT Pub. Date: Feb. 16, 2017

(65) Prior Publication Data
US 2018/0251321 A1 Sep. 6, 2018

(30) Foreign Application Priority Data
Aug. 13, 2015 (NL) .................................. 2015300

(51) Int. Cl.
*B65G 47/51* (2006.01)
*B65G 21/14* (2006.01)
(52) U.S. Cl.
CPC ......... *B65G 47/5122* (2013.01); *B65G 21/14* (2013.01)
(58) Field of Classification Search
CPC ................. B65G 21/14; B65G 47/51–47/5131
(Continued)

(56) References Cited

U.S. PATENT DOCUMENTS

| 4,513,858 A | 4/1985 | Fellner et al. |
| 8,393,458 B2 * | 3/2013 | Kaes .................. B65G 21/2072 198/452 |

(Continued)

FOREIGN PATENT DOCUMENTS

| EP | 2050696 A1 | 4/2009 |
| EP | 2826735 A1 | 1/2015 |

OTHER PUBLICATIONS

International Search Report dated Oct. 28, 2016 for corresponding International Application PCT/NL2016/050574, filed Aug. 11, 2016.
(Continued)

*Primary Examiner* — Gene O Crawford
*Assistant Examiner* — Keith R Campbell
(74) *Attorney, Agent, or Firm* — Steven M. Koehler; Westman, Champlin & Koehler, P.A.

(57) ABSTRACT

A buffering device comprises a frame and a conveyor belt, a supply station, a discharge station, a first reversing member reverses the conveying direction of the conveyor belt, and a return guide includes a second reversing member. The buffering device is configured such that the conveyor belt moves from the supply station via the first reversing member to the discharge station, after which the conveyor belt is guided back to the supply station via the return guide. A portion of the conveyor belt n forms a buffer section of which the length varies. The remaining portion of the conveyor belt forms a compensation section for compensating a change of length of the buffer section during simultaneous displacement of the first and second reversing members with respect to the frame. The first reversing member includes a buffer carriage for radially guiding the conveyor belt, which guide is fixed to the carriage.

15 Claims, 7 Drawing Sheets

(58) Field of Classification Search
USPC .................................................. 198/347.1
See application file for complete search history.

(56) References Cited

U.S. PATENT DOCUMENTS

| | | | | |
|---|---|---|---|---|
| 9,145,270 | B2* | 9/2015 | Touitou | B65G 47/5122 |
| 9,290,321 | B2 | 3/2016 | Seger et al. | |
| 9,896,271 | B1* | 2/2018 | Steeber | B65G 47/5122 |
| 2002/0195317 | A1* | 12/2002 | Wipf | B65G 47/5122 |
| | | | | 198/602 |
| 2006/0225989 | A1 | 10/2006 | Tuck et al. | |
| 2013/0284563 | A1* | 10/2013 | Lopez | B65G 21/22 |
| | | | | 198/459.1 |
| 2015/0021143 | A1 | 1/2015 | Seger et al. | |

OTHER PUBLICATIONS

Written Opinion of the International Searching Authority dated Jan. 2015 for corresponding International Application PCT/NL2016/050574, filed Aug. 11, 2016.

* cited by examiner

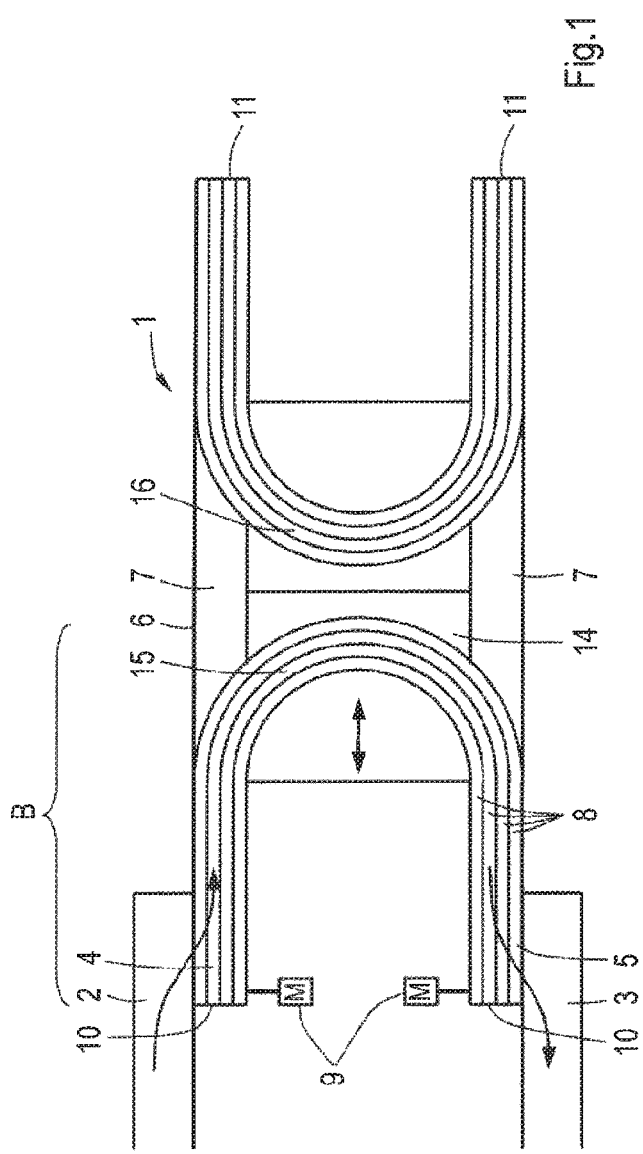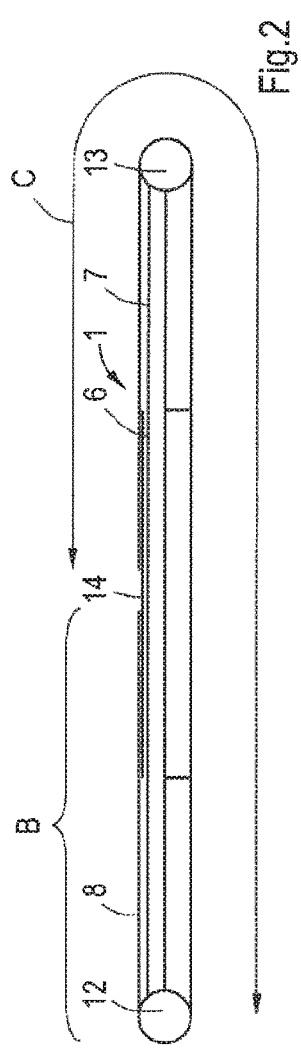

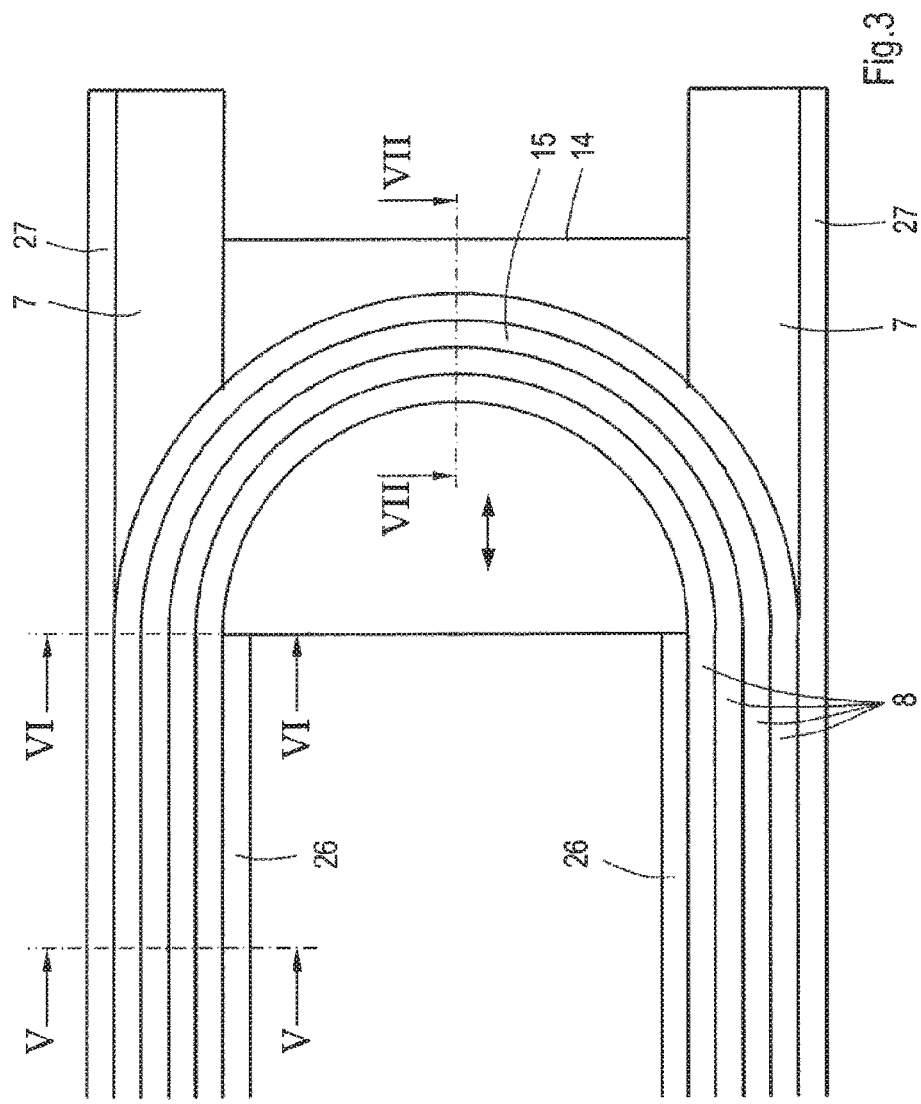

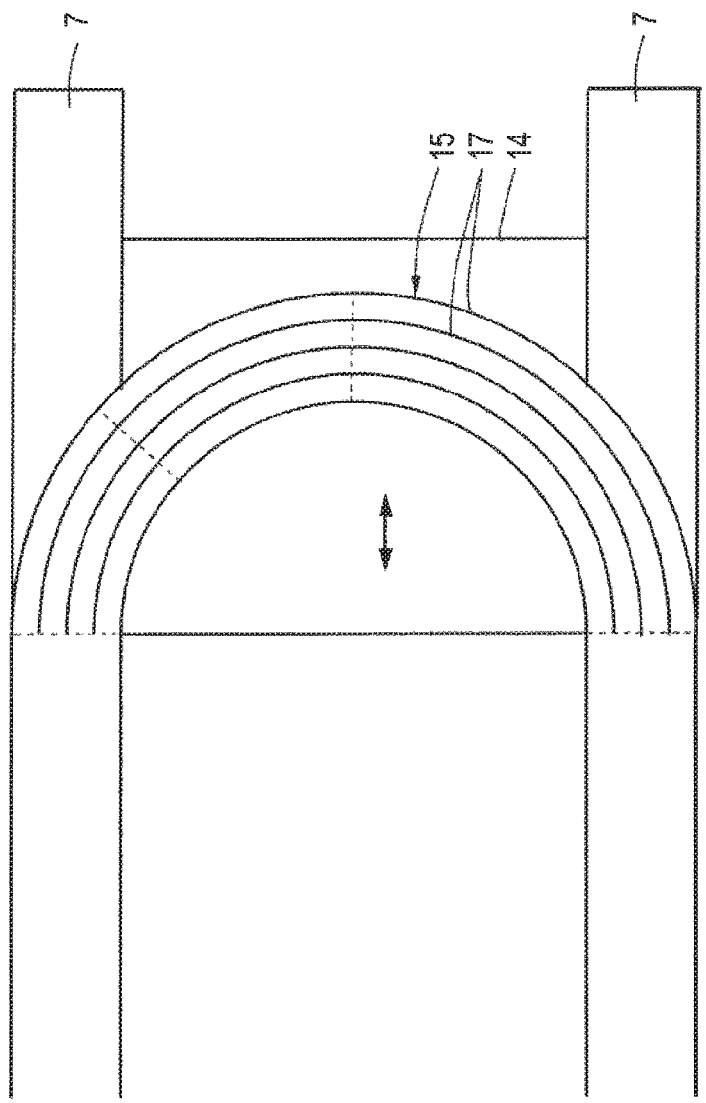

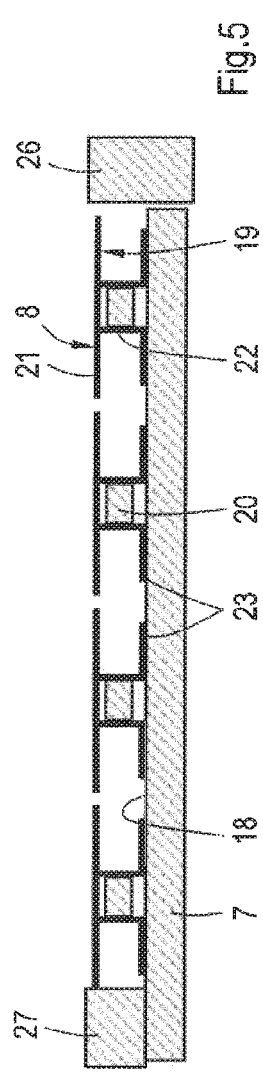
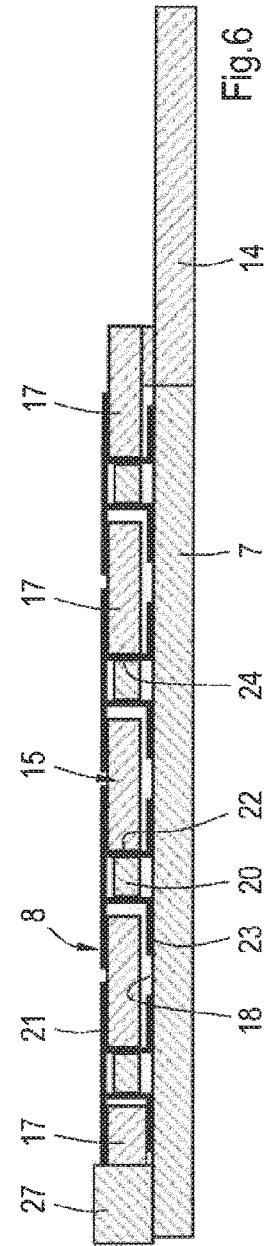
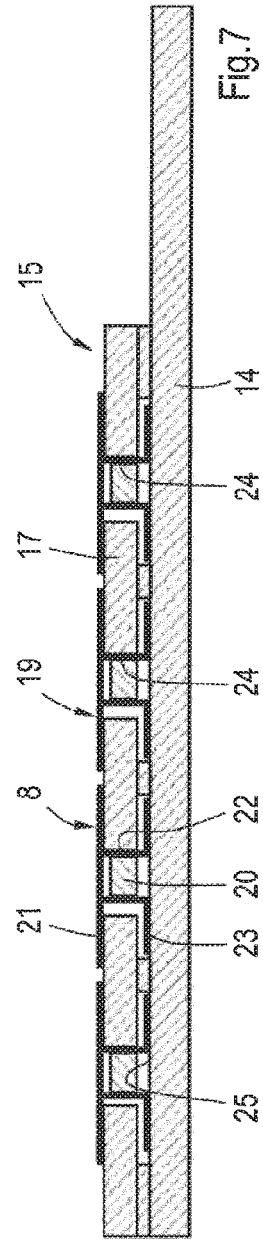

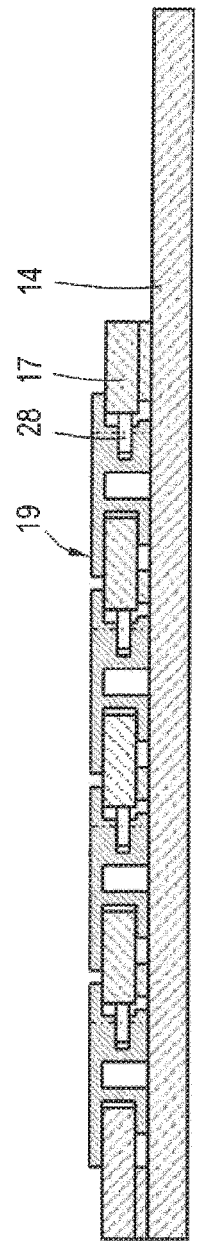
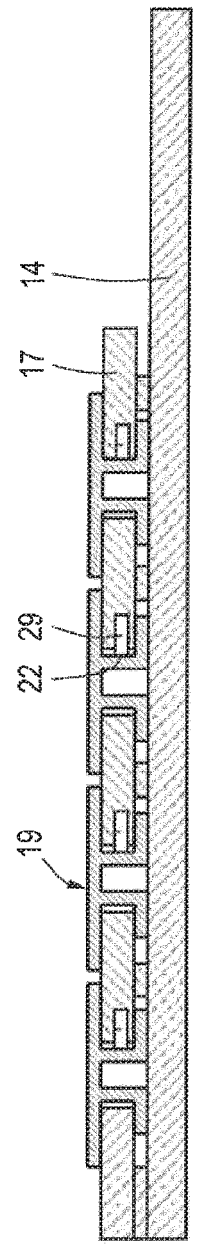

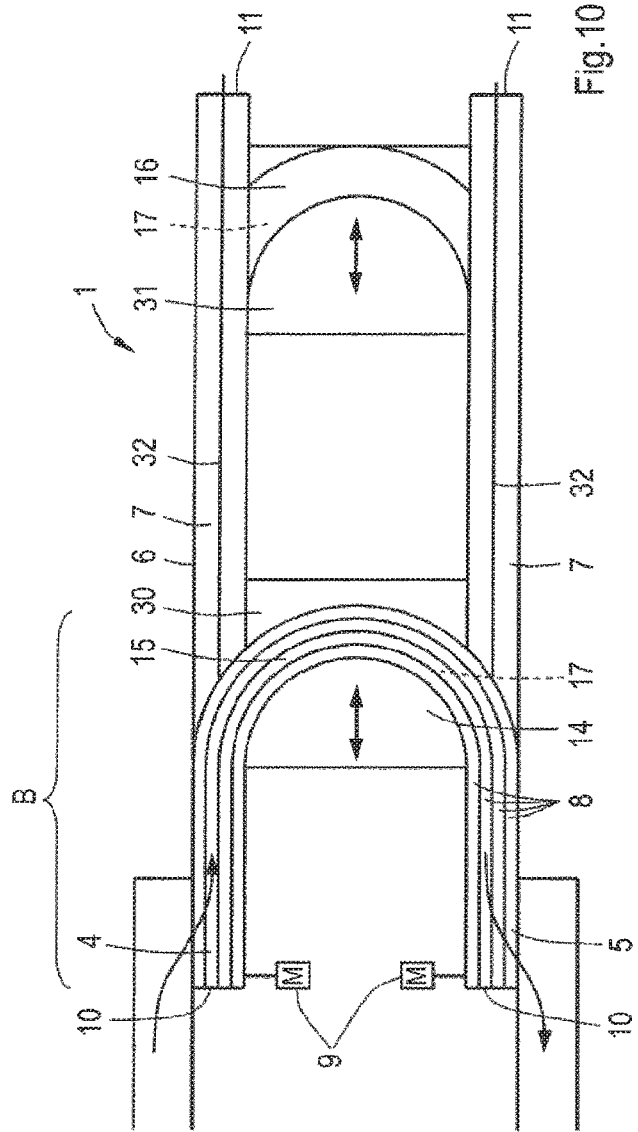
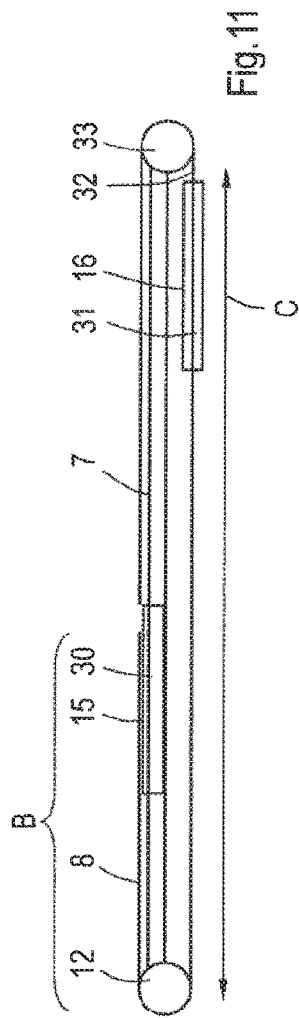

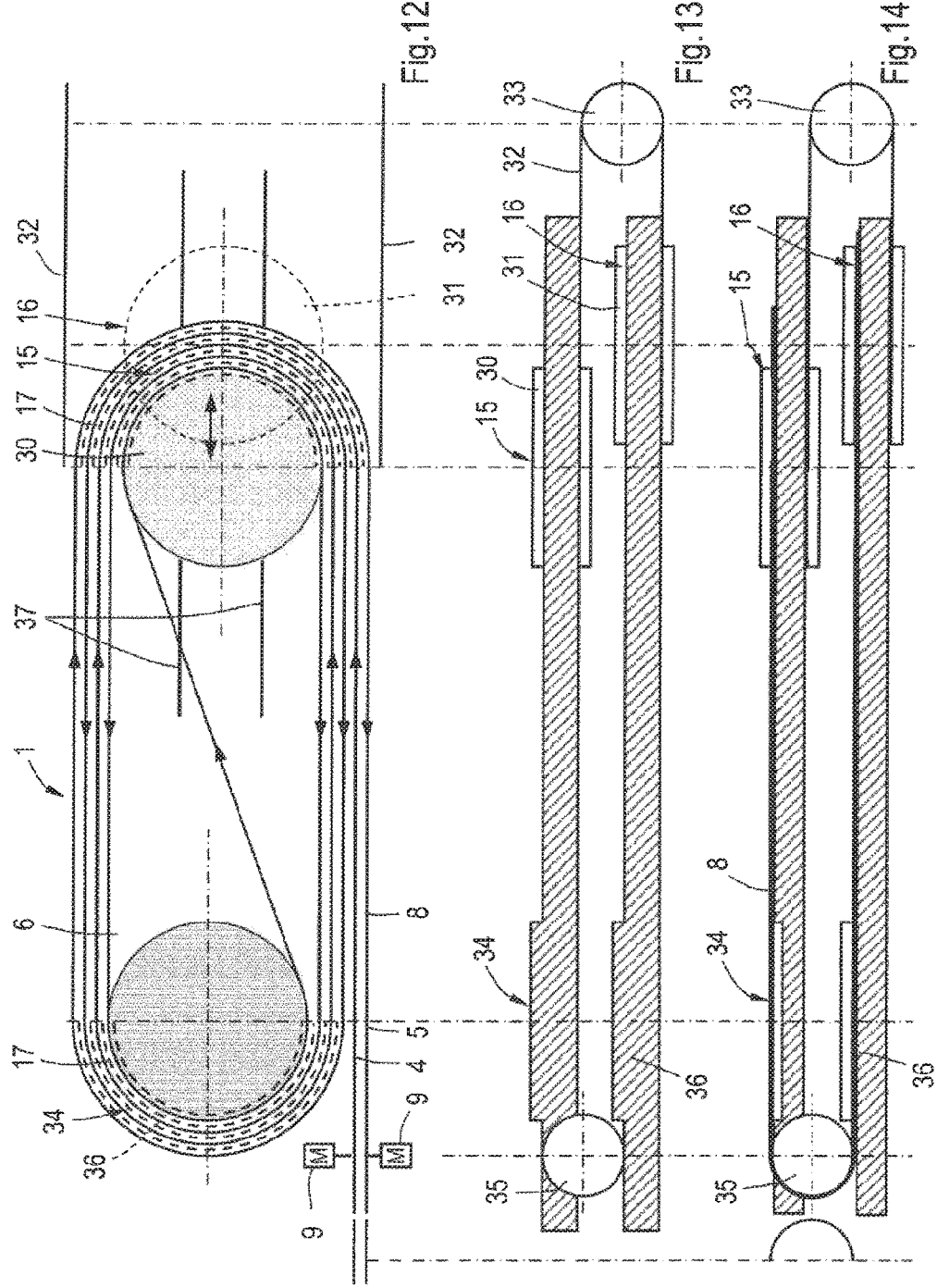

BUFFERING DEVICE

BACKGROUND

The discussion below is merely provided for general background information and is not intended to be used as an aid in determining the scope of the claimed subject matter.

Aspects of the present invention relate to a buffering device.

A buffering device can be used for buffering semi-finished products between apparatus which have temporarily different machining speeds, for example. A disadvantage of a known buffering device is that it is a rather complex system.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A buffering device can include at least a first reversing member provided with a buffer carriage with at least a guide for radially guiding the conveyor belt, which guide is fixed to the buffer carriage.

A fixed guide allows the buffering device to be manufactured simply and relatively low-cost. It also provides the possibility to apply an additional guide, which extends parallel to the fixed guide, for supporting a different section of the conveyor belt or an additional conveyor belt. This is not possible in case of a buffering device including reversing wheels, such as disclosed in the above-mentioned prior art.

The supply station and the discharge station may have fixed positions with respect to the frame, whereas the path followed by the conveyor belt between the supply station and the discharge station can be varied by simultaneously displacing the first and second reversing member. The function of the reversing members is to direct the conveyor belt in an opposite conveying direction after passing the reversing member as seen from above.

In a specific embodiment the frame comprises two parallel support tracks extending in a transport plane and each having a front end and an opposite rear end, wherein at least the first reversing member is located at least partially between the support tracks as seen from above and along which it is displaceable, wherein the buffering device is adapted such that under operating conditions the conveyor belt follows one of the support tracks from the front end thereof and then via the guide of the buffer carriage the other support track in opposite direction to the front end thereof, after which the conveyor belt is guided back again via the return guide to the front end of said one support track, wherein the conveyor belt is a first conveyor belt and the buffering device is provided with at least a second endless, drivable, flexible conveyor belt, which extends parallel to the first conveyor belt so as to form a common conveying surface and wherein the first reversing member is provided with a second guide for radially guiding the second conveyor belt which second guide is fixed to the buffer carriage and the second reversing member is provided with guides for radially guiding both conveyor belts which guides are fixed to the compensation carriage. The guides at the respective reversing members extend parallel to each other such that the conveyor belts run parallel to each other.

The presence of a second conveyor belt provides the possibility to form a wide common conveying surface, which cannot be achieved with a single conveyor belt because of the difference of path length between the inner bend and the outer bend of a conveyor belt at the reversing members. For example, in case of a slat conveyor relatively large movements between the slats and possibly openings will arise at the outer bend when using a single conveyor belt, such that for example in case of mass transport a risk of falling products may arise. Furthermore, in case of applying more than one conveyor belt a driving force can be applied in a better way than in case of applying a single conveyor belt which has the same width as the sum of a plurality of parallel narrow conveyor belts. Besides, it is impossible to guide two separate conveyor belts by means of reversing wheels like in the above-identified known device. The supply station and the discharge station may be located at the respective front ends. The support tracks may be linear.

In a practical embodiment the front ends of the support tracks substantially lie in a plane which extends perpendicularly with respect to the longitudinal direction of the support tracks. The rear ends of the support tracks can also substantially lie in a plane which extends perpendicularly with respect to the longitudinal direction of the support tracks.

In a particular embodiment the buffer carriage and the compensation carriage form a common carriage which is displaceable in the transport plane, wherein the buffering device is adapted such that under operating conditions downstream of the buffer section the conveyor bells are guided via a portion of the return guide to the rear end of one of the support tracks and follow this support track, and follow the other support track via the guides of the second reversing member in opposite direction to the rear end thereof, after which the conveyor belts are guided back again to the front end of the support track upstream of the buffer section via a different portion of the return guide. The first and second reversing member are integrated in the common carriage. The guides of the first and second reversing member may have U-shapes, for example, wherein the legs of the U-shaped guides of the first reversing member and those of the second reversing member are directed in opposite directions.

The return guide can be adapted such that after leaving the front end of the support track the conveyor belts are guided upside down below this support track to the rear end thereof, and after leaving the rear end of the other support track the conveyor belts are guided upside down below this support track back to the front end thereof. This means that the conveyor belts move upside down at the lower sides of the support tracks, but not at the second reversing member.

In order to achieve this, the return guide at the front end and rear end may be provided with respective reversing rollers including axes of rotation which extend parallel to the transport plane and perpendicularly to the longitudinal direction of the support tracks.

The conveyor belts may be retained at the reversing rollers in transverse direction of the support tracks. This provides the possibility of omitting support of the conveyor belts at the support tracks in transverse direction, since this already occurs at the reverse rollers and the guides of the carriage, whereas the conveyor belt is tensioned under operating conditions because of driving it.

In an alternative embodiment the buffer carriage is displaceable in the transport plane and the compensation carriage is displaceable in a plane below the transport plane, for example parallel to it, wherein the buffering device is adapted such that under operating conditions the conveyor belts are guided upside down in at least a part of the compensation section via the return guide and via the guides of the second reversing member. In this case the compensation carriage does not move in the transport plane such that the buffering device can be built in a relatively compact way in the longitudinal direction of the support tracks.

More specifically, the return guide at the front ends may be provided with reversing rollers having axes of rotation which extend parallel to the transport plane and perpendicular to the longitudinal direction of the support tracks so as to guide the conveyor belts upside down below the supporting tracks towards, via and from the second reversing member. The radial guides at the buffer carriage and the compensation carriage may be applied in a comparable manner. Since the conveyor belt follows the second reversing member upside down the guides may possibly support the second reversing member in upward direction, as well.

Also in this case the conveyor belts at the reversing rollers may be retained in transverse direction of the support tracks, such that it is not necessary to support the conveyor belts at the support tracks in transverse direction. This happens already at the reversing rollers and the guides of the buffer carriage, whereas the conveyor belt is tensioned under operating conditions because of driving it.

The buffer carriage and the compensation carriage may be coupled to each other by means of a bendable element, such as a chain, wherein the bendable element is guided about a reversing wheel. This reversing wheel may be located at the rear ends of the support tracks, for example. The buffering device may be adapted such that under operating conditions the buffer carriage and the compensation carriage move in opposite directions as seen from above.

In still another alternative embodiment the buffering device is further provided with a static first reversing member for reversing the conveying direction of the conveyor belt and a static second reversing member for reversing the direction of the conveyor belt, wherein the static first reversing member and the static second reversing member each have at least two parallel guides for radially guiding the conveyor belt which guides are fixed to the frame, wherein the buffering device is adapted such that under operating conditions the conveyor belt moves from the supply station via the one guide of the static first reversing member to the displaceable first reversing member and via the first reversing member back to the static first reversing member, where the conveyor belt moves in opposite direction to the discharge station via the other guide, after which the conveyor belt moves from the discharge station via the one guide of the static second reversing member to the displaceable second reversing member and via the displaceable second reversing member back to the static second reversing member, where the conveyor belt moves via the other guide in opposite direction to the supply station. The static first reversing member and the displaceable first reversing member may lie in a horizontal transport plane.

Hence the static first reversing member has at least two parallel radial guides which are fixed to the frame, whereas the displaceable first reversing member has at least one guide which is fixed to the buffer carriage. Thus, the single conveyor belt moves along the one guide of the static first reversing member in the one direction and along the other guide in opposite direction.

In a practical embodiment the static first reversing member and the displaceable first reversing member lie in a transport plane and the static second reversing member and the displaceable second reversing member lie in a plane below the transport plane, wherein the conveyor belt is guided upside down along the static second reversing member and the displaceable reversing member.

In all embodiments the fixed guide/guides of the respective reversing members may form a circle section/circle sections, for example a semi-circle shape. In case of a plurality of guides per reversing member the circle sections extend concentrically.

The guides may have more functions than guiding the conveyor belt(s) radially at the reversing members. At least one conveyor belt may be supported in upward direction by at least one guide. It is also possible that one conveyor belt is supported in upward direction by two neighbouring guides. For example, the location of the radial support lies between the upwardly directed supporting locations of the neighbouring guides as seen from above. Furthermore, at least one conveyor belt may be supported in downward direction by at least one guide so as to prevent the conveyor belt from moving upwardly. This conveyor belt can possibly be supported in downward direction by two neighbouring guides.

The guide/guides may be provided with a roller bed for radially guiding the conveyor belt/conveyor belts, or the conveyor belt/conveyor belts may be provided with rollers for running the conveyor belt/conveyor belts along the guide/guides. Consequently, friction between the conveyor belt and the guides is minimized.

BRIEF DESCRIPTION OF THE DRAWINGS

Aspects of the invention will hereafter be elucidated with reference to drawings showing embodiments of the invention very schematically.

FIG. 1 is a plan view of an embodiment of a buffering device.

FIG. 2 is a side view of the embodiment according to FIG. 1.

FIG. 3 is a portion of FIG. 1 on a larger scale.

FIG. 4 is a similar view as FIG. 3, but in which the conveyor belts are not shown.

FIG. 5 is a cross-sectional view taken along the line V-V in FIG. 3 on a larger scale.

FIG. 6 is a cross-sectional view taken along the line VI-VI in FIG. 3 on a larger scale.

FIG. 7 is a cross-sectional view taken along the line VII-VII in FIG. 3 on a larger scale.

FIG. 8 is a similar view as FIG. 7 of an alternative embodiment of the buffering device.

FIG. 9 is a similar view as FIG. 7 of another alternative embodiment of the buffering device.

FIGS. 10 and 11 are similar views as FIGS. 1 and 2 of an alternative embodiment of the buffering device.

FIG. 12 is a similar view as FIG. 1 of an alternative embodiment of the buffering device.

FIGS. 13 and 14 are illustrative side views of the embodiment according to FIG. 12, in which different parts are shown.

DETAILED DESCRIPTION OF THE ILLUSTRATIVE EMBODIMENTS

FIG. 1 shows an embodiment of a buffering device 1, as seen from above. FIG. 2 shows the buffering device 1 as seen from one side. The buffering device 1 is connected to a supply conveyor 2 and a discharge conveyor 3. Under operating conditions products are conveyed from the supply conveyor 2 to a supply station 4 of the buffering device 1 and from a discharge station 5 of the buffering device 1 to the discharge conveyor 3, possibly by means of a transfer device. The transport flow at the supply station 4 and the discharge station 5 is indicated by means of arrows in FIG. 1. The buffering device 1 is adapted such that the distance followed by the products between the supply station 4 and the discharge station 5 can be varied, such that differences between supply flows and discharge flows to and from the buffering device 1 can be handled. This is required, for example, when an apparatus located upstream has a temporarily different machining speed than an apparatus located downstream.

The buffering device 1 according to FIG. 1 comprises a frame 6 which is provided with two linear parallel support tracks 7. The support tracks 7 lie in a transport plane and support four parallel, endless, drivable, flexible conveyor belts 8, for example slat belts. In an alternative embodiment the number of conveyor belts 8 may deviate. The conveyor belts 8 are driven by motors 9. The support tracks 7 have front ends 10 and opposite rear ends 11. Front reversing rollers 12 are driven by the motors 9 at the front ends 10. At the rear ends 11 rear reversing rollers 13 are present. In the embodiment as shown the front and rear ends 10, 11 of the support tracks 7 lie in parallel planes which extend perpendicularly with respect to the longitudinal direction of the support tracks 7. As seen from above the front ends 10 lie on a line which extends perpendicularly to the longitudinal direction of the support tracks 7 and which extends parallel to a line through the rear ends 11.

Furthermore, the buffering device 1 is provided with a carriage 14 which is located partially between the support tracks 7 along which it is displaceable. The direction of displacement is indicated by a double-headed arrow in FIG. 1. The carriage 14 may be coupled to the frame 6 through a sliding structure, for example. The carriage 14 has a first reversing member 15 and a second reversing member 16, through which the conveyor belts are reversed 180° within the transport plane. The first reversing member 15 is located closer to the front ends 10 of the support tracks 7 than the second reversing member 16, and the second reversing member 16 is located closer to the rear ends 11 of the support tracks 7 than the first reversing member 15. In the embodiment as shown the first and second reversing member 15, 16 comprise five guides 17, each of which are fixed to the remainder of the carriage 14. This is shown in case of the first reversing member 15 in FIG. 4. The guides 17 have the shape of a semi-circle including a concentrical center in this embodiment.

Each of the endless conveyor belts 8 follows from the front end 10 of the support track 7 at the supply station 4 this support track 7 in the direction of the carriage 14 and is guided via the guides 17 of the first reversing member 15 to the other support track 7. Hence, due to the presence of the 180° bend the conveyor belts 8 move in opposite direction after the first reversing member 15. Subsequently, the conveyor belts 8 follow the latter support track 7 in a direction from the carriage 14 to the front end 10 at the discharge station 5. The path followed by the conveyor belts 8 between the front end 10 at the supply station 4 and the front end 10 at the discharge station 5 form a buffer section B of the common conveyor belts 8, as indicated in FIG. 1. The supply station 4 and the discharge station 5 have fixed positions with respect to the frame 6. The length of the buffer section B can be varied by displacing the carriage 14 along the support tracks 7. This provides the opportunity to vary the distances followed by the conveyor belts 8 between the front ends 10 of the support tracks 7 and the reversing member 15.

Upon leaving the support track 7 at the discharge station 5 the conveyor belts 8 are guided through the front reversing rollers 12 along the lower side of this support track 7 upside down to the rear guide rollers 13 at the rear end 11 of this support track 7. There the conveyor belts 8 are turned upside down again. Subsequently, the conveyor belts 8 move from the rear end 11 of this support track 7 in the direction of the carriage 14, whereas their bearing surfaces are directed upwardly, and are guided to the other support track 7 via guides 17 of the second reversing member 16. Then, the conveyor belts 8 follow this support track 7 in the direction of the rear end 11 of this support track 7 and are guided upside down along the lower side of this support track 7 back to the front guide rollers 12 at the supply station 4 by the rear guide rollers 13 at the rear end 11 of this support track 7. In the embodiment as shown the conveyor belts 8 run upside down at the lower sides of the support track 7 in a plane that extends parallel to the transport plane.

The portion of the conveyor belts 8 which follows the path from the front end 10 of the support track 7 at the discharge station 5 up to the front end 10 of the support track 7 at the supply station 4, forms a compensation section C as indicated in FIG. 2. When the length of the buffer section B is varied by displacing the carriage 14 the compensation section C compensates the change of length of the buffer section B. This means that the compensation section C forms an unloaded portion of the conveyor belts 8.

In the embodiment as shown the front and rear reversing rollers 12, 13 together with the second reversing member 16 form a part of a return guide for the conveyor belts 8. However, in an alternative embodiment the return guide may be arranged differently. It follows from the foregoing that the buffer section B is guided by the first reversing member 15 of the carriage 14 and the compensation section C is guided by the second reversing member 16.

FIGS. 5-7 show cross-sections of the buffering device 1 at different locations in the buffer section B. FIG. 5 shows a cross-section in a linear part of the buffer section B at the support track 7 between the supply station 4 and the first reversing member 15. The conveyor belts 8 slide over a supporting surface 18 of the support track 7, which is plate-shaped in this case. In the embodiment as shown each of the four conveyor belts 8 is a slat belt, in which slats 19 are movable with respect to each other via a chain 20 or an alternative endless, flexible conveying element. The chains 20 of the conveyor belts 8 are driven by the motors 9. As shown in FIG. 5 each slat 19 has a bearing plate 21 including a bearing surface at its upper side on which products are present at the buffer section B under operating conditions. The lower side of the slat 19 is provided with two plates 22 located at either side of the chain 20 to which two outwardly directed feet 23 are connected at a distance from the bearing plate 21. The feet 23 slide over the supporting surface 18 of the support track 7. At the support track 7 in the compensation section C the conveyor belts 8 are supported in a comparable way, but the bearing plates 21 are not occupied under operating conditions.

FIG. 6 shows a cross-section at the transfer between the linear portion of the buffer section B and the first reversing member 15 of the carriage 14. In FIG. 6 all five guides 17 of the first reversing member 15 can be seen. The inner guide 17 having the smallest radius partially lies above the support track 7 at this cross-section, the other four guides 15 lie entirely above the support track 7.

FIG. 7 shows a cross-section at the first reversing member 15 and shows, that the guides 17 are fixed to the remainder of the carriage 14. Each of the four conveyor belts 8 is supported in radial direction by four guides 17. For this reason each of the guides 17 has a radial outwardly directed supporting surface 24 along which the passing plates 22 of the slats 19 slide. The outer guide 17, in FIG. 7 the leftmost guide 17, is not used for radial guidance of the outer conveyor belt 8.

Each of the slats 19 is supported in upward direction at the bearing plates 21 by neighbouring guides 17 located at either side of the conveyor belt 8 and also at the feet 23 which slide over a supporting surface 25 of the carriage 14. Possibly the conveyor belts 8 can be supported in upward direction by the guides 17 only or by the supporting surface 25 of the carriage 14 only.

In the embodiment as shown the slats 19 are also supported in downward direction in order to prevent the slats 19 from moving upwardly. Therefore, the feet 23 are located below the neighbouring guides 17 which lie at either side of the conveyor belt 8.

The guides of the second reversing member 16 in the compensation section C are comparable to those of the first reversing member 15, but mirrored in a mirror plane at the carriage 14 which is perpendicular to the longitudinal direction of the support tracks 7.

FIG. 5 shows that in the linear portion it is only the outer conveyor belts 8 which are retained in transverse direction by an inner lateral guide 26 and an outer lateral guide 27. The lateral guides 26, 27 are intended for protecting the conveyor belts 8 rather than being necessary for lateral support thereof. Basically, support in transverse direction in the linear portion may be omitted. In practice the conveyor belts 8 are automatically kept in place, since the conveyor belts 8 are tensioned because of driving them and they are more or less kept in place in transverse direction at the start and end of a linear path by the radial guides 17 at the carriage 14, on the one hand, and the reversing rollers 12, 13, where the conveyor belts 8 are retained in transverse direction, on the other hand. The outer lateral guides 27 are fixed to the respective support tracks 7, but the inner lateral guides 26 are flexible so as to avoid obstructing the guides 17 of the carriage 14 during displacing it. The inner lateral guides 26 may move away when the carriage 14 is passing, for example. FIG. 3 shows that the lateral guides 26, 27 are present at both support tracks 7.

The conveyor belts 8 lie close to each other and are free from obstacles in transverse direction above the respective supporting plates 21, such that they together form a common wide conveying surface, as shown in FIGS. 5-7. This means that the buffering device 1 can be applied for mass transport, such as transport of bottles. In that case it does not matter if the conveyor belts 8 have different speeds, for example at the reversing members 15, 16.

The carriage 14 can be displaced with respect to the support tracks 7 by means of its own drive means. However, it is also possible to control the motors 9 such that a difference in traction force at the conveyor belts 8 at the supply station 4 and the discharge station 5 occurs, such that the carriage will be displaced.

At the lower side of the support tracks 7 between the reversing rollers 12, 13 the conveyor belts 8 may be supported by separate guides.

FIGS. 8 and 9 show two alternative embodiments of the buffering device 1. In the embodiment according to FIG. 8 at least a number of slats 19 are provided with a small wheel 28 which runs along the cooperating guide 17 under operating conditions. In the embodiment according to FIG. 9 the guides 17 are provided with roller beds 29 along which the plates 22 of the slats 19 move. The features according to the embodiments as depicted in FIGS. 8 and 9 minimize the required driving force for driving the conveyor belts 8.

FIGS. 10 and 11 show a variation to the embodiments as shown in FIGS. 1-9. The most important difference is that instead of a common carriage, such as carriage 14 in FIG. 1, two separate carriages are present: a buffer carriage 30 to which five guides 17 are fixed and a compensation carriage 31 to which also five guides 17 are fixed. The buffer carriage 30 and the compensation carriage 31 are both located between the support tracks 7 as seen from above. The buffer carriage 30 is moveable within the transport plane, but the compensation carriage 31 is moveable within a plane that extends parallel below the transport plane. The buffer carriage 30 and the compensation carriage 31 are connected to each other by means of chains 32 or an alternative bendable element via reversing rollers 33, see FIG. 11. This means that when the buffer carriage 30 moves away from the front ends 10, such that the buffer section B lengthens, the compensation carriage 31 moves in opposite direction towards the front ends 10. It is clear that due to the reversing rollers 12 at the front ends 10 the conveyor belts 8 run upside down in a part of the compensation section C and are also guided upside down by the guides 17 of the second reversing member 16. Therefore, it is desired to support the conveyor belts 8 in the second reversing member 16 not only radially, but also upwardly. When the conveyor belts 8 are configured like the embodiments as described above and shown in FIGS. 5-9, the slats 19 can be supported upwardly at the feet 23, for example. An advantage of the embodiment according to FIGS. 10 and 11 is that the length of the buffering device 1 can be relatively short.

FIG. 12 shows a plan view of another alternative embodiment. The parts which are comparable with those in the former embodiments have the same reference signs. In this case the buffering device 1 is provided with a single conveyor belt 8 which moves from a supply station 4 to a first reversing member 15 which is displaceable with respect to the frame 6 under operating conditions and then moves in opposite direction to a static first reversing member 34, then again to the first reversing member 15 and back again to the static first reversing member 34. After leaving the static first reversing member 34 the conveyor belt 8 moves to the first reversing member 15 in diagonal direction as seen from above and then follows a path to the first reversing member 15 and then follows from there a path to the static first reversing member 34, then to the first reversing member 15, subsequently back to the static first reversing member 34, then to the first reversing member 15 and finally back to the discharge station 5. The direction of movement of the conveyor belt 8 is indicated by arrows in FIG. 12. In an alternative embodiment the number of windings about the static first reversing member 34 and the displaceable first reversing member 15 may be larger or smaller. The portion of the conveyor belt 8 extending from the supply station 4 to the discharge station 5 forms the buffer section of which the length varies upon displacing the first reversing member 15 with respect to the frame 6, or with respect to the static first reversing member 34.

In the embodiment as shown in FIG. 12 the static first reversing member 34 has at least four guides 17 for radially guiding the single conveyor belt 8, which guides are fixed to the frame 6. The guides 17 are indicated by broken lines in FIG. 12. In this embodiment the displaceable first reversing member 15 has at least five guides 17 for radially guiding the single conveyor belt 8 which guides 17 are fixed to the buffer carriage 30, since in this embodiment the conveyor belt 8 passes the first reversing member 15 once more than the static first reversing member 34. The guides 17 of the displaceable first reversing member 15 are also indicated by means of broken lines in FIG. 12. The guides 17 of the displaceable first reversing member 15 are also fixed to the buffer carriage 30 such as also explained in the above-mentioned embodiments. In this case the inner guides 17 of the static first reversing member 34 and the displaceable first reversing member 15 are made longer for guiding the diagonal portion of the conveyor belt 8 such that they are slightly longer than a semi-circle.

The buffering device 1 of the embodiment as shown in FIGS. 12-14 comprises a return guide including reversing rollers 35 at the supply station 4 and the discharge station 5 which guide the conveyor belt 8 upside down in a plane that extends below the plane in which the buffer section extends. The portion of the conveyor belt 8 which extends from the discharge station 5 to the supply station 4 via the lower plane forms the compensation section. The return guide further comprises a second reversing member 16 which is displaceable with respect to the frame 6, and a static second reversing member 36. The static second reversing member 36 extends below the static first reversing member 34 and is also provided with guides 17 for radially supporting the conveyor belt 8 which guides 17 are fixed to the frame 6. The displaceable second reversing member 16 is provided with guides 17 which are fixed to the compensation carriage 31, similar to the displaceable first reversing member 16. The buffer carriage 30 and the compensation carriage 31 are connected to each other by means of chains 32 or an alternative bendable element via a reversing roller 33.

When the buffer carriage 30 moves in a direction away from the static reversing member 34 the length of the buffer section increases and the compensation carriage 31 moves in opposite direction to the static second reversing member 36. When the buffer carriage 30 and the compensation carriage 31 are located exactly above each other the buffering device 1 is more or less mirror symmetrical with respect to a mirror plane that extends parallel to the transport plane.

Similar to the embodiments as described hereinbefore under operating conditions the conveyor belt 8 moves from the supply station 4, in this case via some extra windings about the static first reversing member 34 and the displaceable first reversing member 15, via the first reversing member 15 to the discharge station 5, after which the conveyor belt 8 is guided back to the supply station 4 via the return guide with the second reversing member 16, whereas upon simultaneous displacement of the first and second reversing member 15, 16 with respect to the frame 6 a change of length of the buffer section is compensated by the compensation section. The guides 17 of the first reversing member 15 as well as the guides of the second reversing member 16 are fixed to the buffer carriage 30 and the compensation carriage 31.

As seen from above the conveyor belt 8 follows a path from the supply station 4 and the discharge station 5 to the buffer carriage 30 like a pair of parallel opposite directed transport sections, where the pair of transport sections follows two outer, neighbouring, parallel radial guides 17. After reversal via comparable guides 17 at the static first reversing member 34 the pair of transport sections follows two guides 17 at the buffer carriage 30 which lie further inwardly. After still another reversal via comparable guides 17 at the static first reversing member 34 the pair of transport sections is divided and the conveyor belt 8 is guided about an inner guide 17 of the buffer carriage 30. Hence, the pair of transport sections follows a sort of volute path. In the compensation section the conveyor belt 8 is guided in a comparable manner.

In this embodiment the frame 6 is provided with a plate on which the conveyor belt 8 slides between the static first reversing member 34 and the displaceable first reversing member 15. In the compensation section the conveyor belt 8 is supported at its lower side, for example.

The buffer carriage 30 may be retained in transverse direction of the direction of displacement of the buffer carriage 30 via slots 37 in the plate, for example. These slots 37 may be dimensioned such that the conveyor belt 8 is not obstructed by the slots 37 in the diagonal section on the plate. It may be clear that the orientation of the diagonal section of the conveyor belt 8 changes upon displacing the first reversing member 15 with respect to the frame 6 as seen from above.

In an alternative embodiment the static first reversing member 34, the displaceable first reversing member 16, the displaceable second reversing member 16 and the static second reversing member 36 lie in a common plane and the buffer carriage 30 and the compensation carriage 31 are integral, comparable with the embodiment according to FIG. 1.

All the embodiments of the buffering device 1 as described herein have a buffer carriage 14, 30 and a cooperating compensation carriage 14, 31 which comprise a plurality of parallel fixed radial guides 17 each. In the embodiments according to FIGS. 1-11 the guides 17 guide a plurality of parallel conveyor belts 8 which move along the guides 17 in the same direction and together form a relatively wide conveying surface, whereas the guides 17 in the embodiment as shown in FIGS. 12-14 guide a single conveyor belt 8 which follows neighbouring guides 17 in opposite direction.

The invention is not limited to the embodiments as described above, which may be varied in different manners within the scope of the claims.

The invention claimed is:

1. A buffering device, comprising:
a frame;
an endless, drivable, flexible conveyor belt being supported by the frame;
a supply station configured to supply products to the conveyor belt;
a discharge station configured to discharge products from the conveyor belt;
a first reversing member configured to reverse a conveying direction of the conveyor belt, the first reversing member being displaceable with respect to the frame;
a return guide provided with a second reversing member configured to reverse the conveying direction of the conveyor belt, the second reversing member being displaceable with respect to the frame on a compensation carriage;
wherein the buffering device is configured such that under operating conditions the conveyor belt moves from the supply station via the first reversing member to the discharge station, after which the conveyor belt is guided back to the supply station via the return guide;
wherein a portion of the conveyor belt extending from the supply station to the discharge station forms a buffer section of which a length varies upon displacing the first reversing member with respect to the frame and a remaining portion of the conveyor belt forms a compensation section configured to compensate a change of length of the buffer section during simultaneous displacement of the first and second reversing members with respect to the frame;

wherein the at least the first reversing member is provided with a buffer carriage with at least one buffer carriage guide configured to radially guide the conveyor belt, the at least one buffer carriage guide being fixed to the buffer carriage;

wherein the frame comprises two parallel support tracks extending in a transport plane and each having a front end and an opposite rear end;

wherein at least the first reversing member is located at least partially between the support tracks as seen from above and along which the at least the first reversing member is displaceable;

wherein the buffering device is configured such that under operating conditions the conveyor belt follows one of the support tracks from the front end thereof via the at least one buffer carriage guide of the buffer carriage to the other support track in opposite direction to the front end thereof, after which the conveyor belt is again guided back via the return guide to the front end of said one support track;

wherein the conveyor belt is a first conveyor belt and the buffering device is provided with at least a second endless, drivable, flexible conveyor belt, which extends parallel to the first conveyor belt so as to form a common conveying surface and wherein the first reversing member is provided with a second buffer carriage guide configured to radially guide the second conveyor belt, the second buffer carriage guide being fixed to the buffer carriage and the second reversing member is provided with second reversing member guides configured to radially guide both conveyor belts, the second reversing member guides being fixed to the compensation carriage.

2. The buffering device according to claim 1, wherein the buffer carriage and the compensation carriage form a common carriage which is displaceable in the transport plane and wherein the buffering device is configured such that under operating conditions downstream of the buffer section the conveyor belts are guided via a portion of the return guide to a rear end of one of the support tracks and follow this support track, and follow the other support track via the second reversing member guides of the second reversing member in opposite direction to the rear end thereof, after which the conveyor belts are again guided back to the front end of the support track upstream of the buffer section via a different portion of the return guide.

3. The buffering device according to claim 2, wherein the return guide is configured such, that after leaving the front end of the support track the conveyor belts are guided upside down below this support track to the rear end thereof, and after leaving the rear end of the other support track the conveyor belts are guided upside down below this support track back to the front end thereof.

4. The buffering device according to claim 3, wherein the return guide at the front end and rear end are provided with respective reversing rollers including axes of rotation which extend parallel to the transport plane and perpendicularly to a longitudinal direction of the support tracks.

5. The buffering device according to claim 4, wherein the conveyor belts are retained at the reversing rollers in transverse direction of the support tracks.

6. The buffering device according to claim 1, wherein the buffer carriage is displaceable in the transport plane and the compensation carriage is displaceable in a plane below the transport plane, wherein the buffering device is configured such that under operating conditions the conveyor belts are guided upside down in at least a part of the compensation section via the return guide and via the second reversing member guides of the second reversing member.

7. The buffering device according to claim 6, wherein the return guide at the front ends is provided with reversing rollers having axes of rotation which extend parallel to the transport plane and perpendicular to a longitudinal direction of the support tracks so as to guide the conveyor belts upside down below the support tracks to, via and from the second reversing member.

8. The buffering device according to claim 7, wherein the conveyor belts at the reversing rollers are retained in transverse direction of the support tracks.

9. The buffering device according to claim 6, wherein the buffer carriage and the compensation carriage are coupled to each other by a bendable element, wherein the bendable element is guided about a reversing wheel.

10. The buffering device according to claim 1, wherein the guide/guides of each of the respective reversing members forms/form a circle section/circle sections.

11. The buffering device according to claim 1, wherein at least one conveyor belt is supported in upward direction by at least one guide of the buffer carriage guides.

12. The buffering device according to claim 11, wherein the conveyor belt is supported in upward direction by two guides of the buffer carriage guides.

13. The buffering device according to claim 1, wherein at least one conveyor belt is supported in downward direction by at least one guide of the buffer carriage guides so as to prevent the conveyor belt from moving upwardly.

14. The buffering device according to claim 13, wherein the conveyor belt is supported in downward direction by two guides of the buffer carriage guides.

15. The buffering device according to claim 1, wherein the guide/guides is/are provided with a roller bed for radially guiding the conveyor belt/conveyor belts, or wherein the conveyor belt/conveyor belts is/are provided with rollers for running the conveyor belt/conveyor belts along the guide/guides.

* * * * *